United States Patent
Swaminathan et al.

(10) Patent No.: US 11,809,992 B1
(45) Date of Patent: Nov. 7, 2023

(54) APPLYING COMPRESSION PROFILES ACROSS SIMILAR NEURAL NETWORK ARCHITECTURES

(71) Applicant: Amazon Technologies, Inc., Seattle, WA (US)

(72) Inventors: Gurumurthy Swaminathan, Redmond, WA (US); Ragav Venkatesan, Seattle, WA (US); Xiong Zhou, Bothell, WA (US); Runfei Luo, Kirkland, WA (US); Vineet Khare, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 514 days.

(21) Appl. No.: 16/836,376

(22) Filed: Mar. 31, 2020

(51) Int. Cl.
*G06N 3/08* (2023.01)
*G06N 3/082* (2023.01)
*G06N 3/045* (2023.01)

(52) U.S. Cl.
CPC .................................. *G06N 3/082* (2013.01); *G06N 3/045* (2023.01)

(58) Field of Classification Search
USPC .............................. 704/202, 232, 259; 706/25
See application file for complete search history.

(56) References Cited

U.S. PATENT DOCUMENTS

2015/0347585 A1  12/2015  Klotz
2019/0251422 A1   8/2019  Ramanath et al.
(Continued)

OTHER PUBLICATIONS

Aidan N. Gomez, et al., "Learning Sparse Networks Using Targeted Dropout", arXiv"1905.13678v5, Sep. 9, 2019, Pages 1-14.
Amir H. Ashouri, et al., "Fast On-the-fly Retraining-free Sparsification of Convolutional Neural Networks", arXiv:181.04199v3, Sep. 8, 2019, Pages 1-8.
Anthony Robins, "Catastrophic Forgetting, Rehearsal, and Pseudorehearsal", Connection Science, 7(2), 1995, Pages 123-146.
Anubhav Ashok, et al., "N2N Leamig: Network to Network Compression via Policy Gradient Reinforcement Learning", arXiv:1709.06030v2, Dec. 17, 2017, Pages 1-20.
Aravind Rajeswaran, et al., "Learning Complex Dexterous Manipulation with Deep Reinforcement Learning and Demostrations", arXiv:1709.10087v2, Jun. 26, 2018, Pages 1-9.
Ari S. Morcos, et al., "OneTicket to win them all: generalizing lottery ticket initializations across datasets and optimizers", arXiv:1906.02773v2, Oct. 27, 2019, Pages 1-13.

(Continued)

*Primary Examiner* — Leonard Saint-Cyr
(74) *Attorney, Agent, or Firm* — S. Scott Foster; Kowert, Hood, Munyon, Rankin & Goetzel, P.C.

(57) ABSTRACT

Neural networks with similar architectures may be compressed using shared compression profiles. A request to compress a trained neural network may be received and an architecture of the neural network identified. The identified architecture may be compared with the different network architectures mapped to compression profiles to select a compression profile for the neural network. The compression profile may be applied to remove features of the neural network to generate a compressed version of the neural network.

20 Claims, 8 Drawing Sheets

(56) References Cited

U.S. PATENT DOCUMENTS

| | | | |
|---|---|---|---|
| 2019/0392300 | A1 | 12/2019 | Weber et al. |
| 2020/0041033 | A1 | 2/2020 | Goldman |
| 2020/0265567 | A1* | 8/2020 | Hu et al. ............ G06N 3/0454 |
| 2020/0372621 | A1* | 11/2020 | Naruniec et al. .... G06N 3/0454 |
| 2020/0410336 | A1 | 12/2020 | Choudhury et al. |
| 2021/0027470 | A1* | 1/2021 | Lin et al. ............... G06N 3/082 |
| 2021/0335017 | A1* | 10/2021 | Covell et al. .......... H04N 19/00 |

OTHER PUBLICATIONS

Barret Zoph, et al., "Neural Architecture Search with Reinforcement Learning", arXiv:1611.01578v2, Feb. 15, 2017, Pages 1-16.

Christopher Berner, et al., "Dota 2 with Large Scale Deep Reinforcement Learning", arXiv:1912.06680v1, Dec. 13, 2019, Pages 1-66.

Christos Louizos, et al., "Learning Sparse Neural Networks through Lo Regularization", arXiv:1712.01312v2, Jun. 22, 2018, Pages 1-13.

David Silver, et al., "Mastering the game of Go with deep neural networks and tree search", Nature, Volume 529, Jan. 28, 2016, pages 484-503.

Deepak ittal, et al., "Recovering from Random Pruning: On the Plasticity of Deep Convolutional Neural Networks", arXiv:1801.10447v1, Jan. 31, 2018, Pages 1-10.

Dmitry Molchanov, et al., "Variational Dropout Sparsifies Deep Neural Networks", in Proceedings of the 34th International Conference on Machine Learning, PMLR 70, 2017, Pages 1-10.

Geoffrey Hinton, et al., "Distilling the Knowledge in a Neural Network", arXiv:1503.02531v1, Mar. 9, 2015, Pages 1-9.

Hao Zhou, et al., "Less is More: Towards Compact CNNs", . In European Conference on Computer Vision, Springer, 2016, Pages 662-677.

Hattie Zhou, et al., "Deconstructing Lottery Tickets: Zeros, Signs, and the Supermask", arXiv:1905.01607v4, Mar. 3, 2020, Pages 1-18.

Hengyuan Hu, et al., "Network Timing: A Data-Driven Neuron Pruning Approach towards Efficient Deep Architectures", arXiv:1607.03250v1, Jul. 12, 2016, Pages 1-9.

Ji Lin, et al., "Rutime Neural Pruning", in The 31st Conference on Neural Information Processing Systems (NIPS 2017), 2017 Pages 1-11.

Jiahui Yu, et al., "Universally Slimmable Networks and Improved Training Techniques", Proceedings of the IEEE/CVF international Conference on Computer Vision, 2019, Pages 1-9.

Jian-Hao Luo, et al., "ThiNet: A Filter Level Pruning Method for Deep Neural Network Compression", In The IEEE International Conference on Computer Vision (ICCV), Oct. 2017, Pages 5058-5066.

Jianbo Ye, et al., "Rethinking the Smaller-Norm-Less-Informative Assumption in Channel Pruning on Convolutional Layers", arXiv:1802.00124v2, Feb. 2, 2018, Pages 1-11.

John Schulman, et al., "Proximal Policy Optimization Algorithms", arXiv:1707.06347v2, Aug. 28, 2017, Pages 1-12.

Jonathan Frankle, et al., "The Lottery Ticket Hypothesis: Finding Sparse, Trainable Neural Networks", arXiv:1803.03635v5, Mar. 4, 2019, Pages 1-42.

Jose M. Alvarez, et al., "Learning the Number of Neurons in Deep Networks", arXiv:1611.06321v3, Oct. 11, 2018, Pages 1-9.

Kaiming He, et al., "Deep Residual Learning for Image Recognition", in Proceedings of the IEEE conference on computer vision and pattern recognition, 2016, Pages 770-778.

Marcin Andrychowicz, et al., "Learning dexterous in-hand manipulation", in The International Journal of Robotics Research 39 (1), 2020, Pages 1-18.

Pavlo Molchanov, et al., "Pruning Convolutional Neural Networks for Resource Efficient Inference", arXiv:1611.06440v2, Jun. 8, 2017, Pages 1-17.

Ragav Venkatesan, et al., "Diving deeper into mentee networks", arXiv:1604.08220v1, Apr. 27, 2016, Pages 1-9.

Ruichi Yu, et al., "NISP: Pruning Networks using Neuron Importance Score Propagation", In The IEEE Conference on Computer Vision and Pattern Recognition (CVPR), Jun. 2018, Pages 9194-9203.

Shashank Singh, et al., "DARC: Differentiable Architecture Compression", arXiv:1905.08170v1, May 20, 2019, Pages 1-19.

Song Han, et al., "Learning both Weights and Connections for Efficient Neural Networks", arXiv:1506.02626v3, Oct. 30, 2015, Pages 1-9.

Suraj Srinivas, et al, "Data-free Parameter Pruning for Deep Neural Networks", arXiv:1507.06149v1, Jul. 22, 2015, Pages 1-12.

Timothy P. Lillicrap, et al., "Continuous Control with Deep Reinforcement Learning", arXiv:1509.02971v6, Jul. 5, 2019, Pages 1-14.

Ting-Wu Chin, et al., "Layer-Compensated Pruning for Resource-Constrained Convolutional Neural Networks", arXiv:1810.00518v2, Oct. 18, 2018, Pages 1-12.

U.S. Appl. No. 16/831,584, filed Mar. 26, 2020, Ragav Venkatesan, et al.

U.S. Appl. No. 16/831,595, filed Mar. 26, 2020, Gurumurthy Swaminathan, et al.

Vadim Lebedev, et al., "Fast ConvNets Using Group-wise Brain Damage", In Proceedings of the IEEE Conference on Computer Vision and Pattern Recognition, 2016, Pages 2554-2564.

Wei Wen, et al., "Leaning Structured Sparsity in Deep Neural Networks", arXiv:1608.03665v4, Oct. 18, 2016, Pages 1-10.

Xin Wang, et al., "SkipNet: Learning Dynamic Routing in Convolutional Networks", In The European Conference on Computer Vision (ECCV), Sep. 2018, Pages 1-16.

Yang He, et al., "Soft Filter Pruning for Accelerating Deep Convolutional Neural Networks", arXiv:1808.06866v1, Aug. 21, 2018, Pages 1-8.

Yann Le Cun, et al., "Optimal Brain Damage", In Advances in neural information processing systems, 1990, Pages 598-605.

Yihui He, et al., "AMC: AutoML for Model Compression and Acceleration on Mobile Devices", In The European Conference on Computer Vision (ECCV), Sep. 2018, Pages 1-17.

Yihui He, et al., "Channel Pruning for Accelerating Very Deep Neural Networks", In The IEEE International Conference on Computer Vision (ICCV), Oct. 2017, Pages 1-9.

Yuandong Tian, et al., "ELF: An Extensive, Lightweight and Flexible Research Platform for Real-time Strategy Games", arXiv:1707.01067v2, Nov. 10, 2017, Pages 1-14.

Zehao Huang, et al., "Data-Driven Sparse Structure Selection for Deep Neural Networks", In The European Conference on Computer Vision (ECCV), Sep. 2018, Pages 1-17.

Zhuang Liu, et al., "Learning Efficient Convolutional Networks through Network Slimming", In Proceedings of the IEEE International Conference on Computer Vision, 2017, Pages 2736-2744.

Zhuang Liu, et al., "Rethinking the Value of Network Pruning", arXiv:1810.05270v2, Mar. 5, 2019, Pages 1-21.

Zhuwei Qin, et al., "Demystifying Neural Network Filter Pruning", arXiv:1811.02639v1, Oct. 29, 2018, Pages 1-4.

Michael H. Zhu, et al., "To prune, or not to prune: exploring the efficacy of pruning for model compression", arXiv:1710.01878v2, Nov. 13, 2017, Pages 1-11.

\* cited by examiner

APPLYING COMPRESSION PROFILES ACROSS SIMILAR NEURAL NETWORK ARCHITECTURES

BACKGROUND

Neural networks are implemented in a wide variety of machine learning applications and offer solutions to perform tasks that are difficult for other types of machine learning techniques to perform. Convolutional neural networks, for example, are implemented across different types of recognition, recommendation, and classification systems. With the increasing numbers of problems being addressed with neural networks, the scale and complexity of neural networks to model the solutions for these problems is also increasing. To accommodate larger and more complex neural networks, increasing numbers of computational resources may need to be utilized which may stymie the application of neural networks in addressing new problems or providing solutions in different ways.

Figure 1:
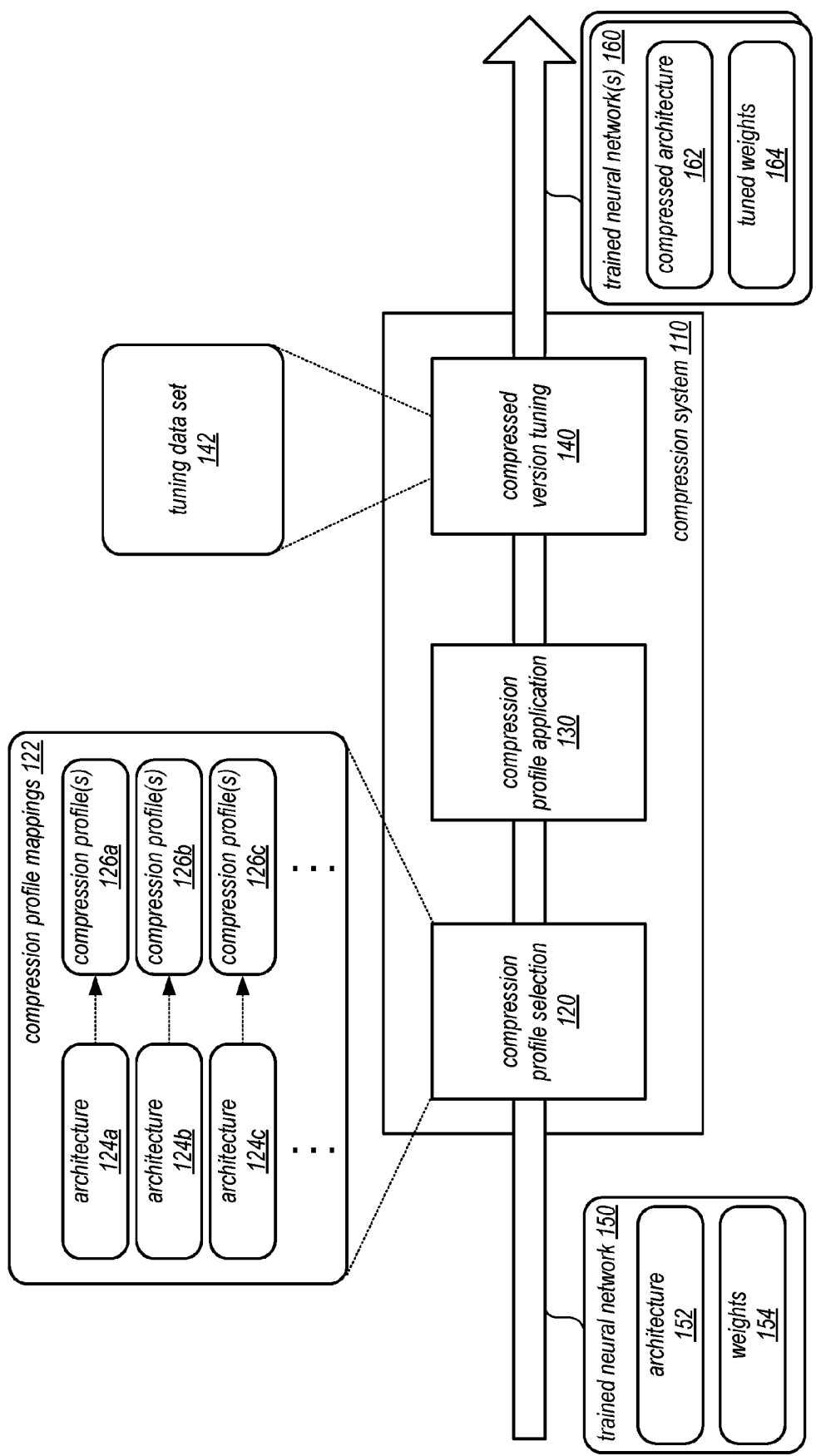
FIG. 1 illustrates a logical block diagram of applying compression profiles across similar neural network architectures, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques of applying compression profiles across similar neural network architectures are described herein. In various embodiments, network compression may be performed to reduce the size of a trained network. Such compression may be applied to minimize a change in the accuracy of results provided by the neural network. As very large neural networks can become cost prohibitive to implement in systems with various processing limitations (e.g., memory, bandwidth, number of nodes, latency, processor capacity, etc.), techniques to provide compressed neural networks (e.g., layer, channel, or node pruning) can expand the possible implementations for a neural network (e.g., across different systems or devices with various resource limitations to implement the neural network). For example, compression may be implemented to lower the memory or power requirements for a neural network, or may be compressed to reduce latency be providing a faster result (e.g., a faster inference), in various embodiments.

Determining how to compress a neural network is also not without cost. Thus, the techniques described in various embodiments to apply compression profiles across similar network architectures may be implemented to decrease the cost (e.g., reduce time, making the compression faster) to apply compression. For example, channel pruning is one type of network compression that may be implemented in various embodiments, where the number of channels in each layer of a neural network is reduced. In some embodiments, a channel pruning algorithm may determine a number of channels to prune in each layer and which channels to prune in each layer. Instead of implementing iterative techniques that are time and resource intensive to determine the number and which channels to prune, fast network compression can be achieved from the application of predefined compression profiles that are specific to a network architecture (or similar network architectures) to quickly make compression decisions, such as how much to prune in each layer of a neural network, in various embodiments. Since the compression profiles may be applicable to any trained network of the same architecture, using these profiles can provide a high accuracy for the corresponding compression without utilize expensive and iterative analysis and instead provide a single-pass technique to compress a neural network. Moreover, using compression profiles in this way can reduce time taken for compression, as analysis may not be needed on the trained neural network.

In various embodiments, randomization can be used to select the features to remove, such as random pruning of channels from a neural network, as random pruning may works as well as any metric-based pruning. Moreover, since random pruning can be applied to the network without the analysis of the network features (as noted above) such as the weights, gradients, etc., and can be applied in a single-pass without iteration, further improvements to the speed of neural network compression can be accomplished. The deployment of compression techniques may also be simplified as a compression system may not need to compute complicated metrics (such as gradient, etc.) from the neural network. In other embodiments, other techniques can be utilized to select which features to remove, such as max-metric, learned, or online techniques.

FIG. 1 illustrates a logical block diagram of applying compression profiles across similar neural network architectures, according to some embodiments. Compression system 110 may be implemented as a stand-alone system, service or application, or may be implemented as part of a service, like machine learning service 210 discussed below with regard to FIG. 2. Compression system 110 may receive requests to compress trained neural networks, such as trained neural network 150. Various types of compression may be applied such as channel pruning. Various other features of a neural network (e.g., various neurons or filters) can also be removed to compress a neural network.

Trained neural network 150 (which may be sometimes referred to as a neural network artifact in some embodiments) may include a network architecture 152, which may be the arrangements, connections, or relationships between various neurons, layers, channels, filters, or other features of the neural network 150. Weights 154 may be the parameters or other values applied by the various features of trained neural network 150 in order to produce a result (e.g., an inference).

Compression system 110 may implement compression profile selection 120 in order to identify a compression profile to apply to trained neural network 150, in various embodiments. For example, in some embodiments, compression profile mappings 122 may be maintained (e.g., as a database or other data structure or data store) to map network architectures, like architectures 124*a*, 124*b*, and 124*c*, to corresponding one or more compression profiles, such as compression profile(s) 126*a*, 126*b*, and 126*c*. A compression profile may be, in various embodiments, information to determine the number and/or location of features to remove from a neural network architecture to compress that neural network architecture. For example, a compression profile may be produced from a compression policy that is trained for compressing the same or similar neural network architectures. As discussed in detail below with regard to FIGS. 3, 6, and 7, compression profile selection 120 can rely upon the generation of new or updated compression profiles from new or provided compression policies (e.g., newly trained/generated or manually specified) in order to improve the performance of compression profile selection over time. In this way, compression system 110 may dynamically improve the performance of compression applied to received, trained neural networks, like trained neural network 150.

Compression system 110 may implement compression profile application 130, in some embodiments. Compression profile application 130 may apply a selected compression profile to trained neural network 150 using the profile information. For example, a pruning profile may describe how much to prune each layer of a CNN and which features (e.g., nodes) within the layer to prune. As noted above, compression profiles can be generated from various compression policies and thus various compression policies that specify techniques, such as network or layer compression, heuristics, learned, or online compression, random, max-metric, learned or online feature selection, among others, may be determinative of how much and which features a selected compression profile applies.. The compressed version of the trained neural network can then be provided to compressed version tuning 140.

In various embodiments, compression system 110 may implement compressed version tuning 140 in order to apply a tuning data set 142 to retrain the compressed version of the neural network. Tuning data set 142 may be provided by requesting client or other application that submitted the trained neural network 150, in some embodiments. In other embodiments, tuning data set 142 may be provided from another source than the source of the trained neural network 150. As illustrated in FIG. 1, compressed version tuning 140 may provide a trained neural network 160 that includes compressed architecture 162 and tuned weights 164 according to the selected compression profile and tuning data set 142, in various embodiments.

Please note that the previous description of is a logical illustration of applying compression profiles across similar neural network architectures and thus is not to be construed as limiting as to the compression system, neural network, compression type, or network tuning. For example, some features of compression system 110 could be implemented separately by another system, such as compressed version tuning 140.

This specification begins with a general description of a provider network that implements multiple different services, including a machine learning service, which may perform applying compression profiles across similar neural network architectures. Then various examples of, including different components/modules, or arrangements of components/module that may be employed as part of implementing the machine learning service are discussed. A number of different methods and techniques to implement applying compression profiles across similar neural network architectures are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
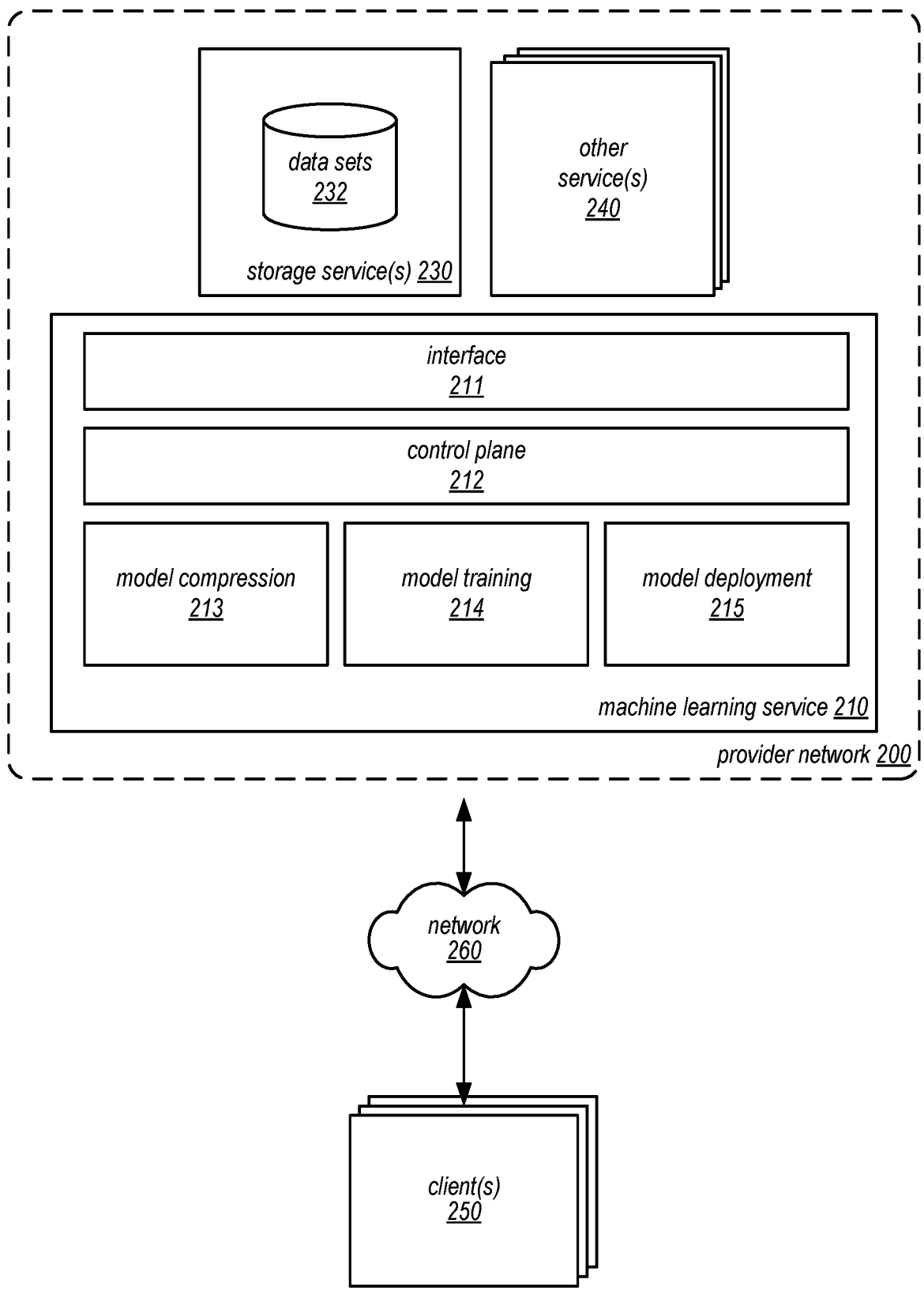
FIG. 2 illustrates an example provider network that may implement a machine learning service that performs machine learning model compression, according to some embodiments.

FIG. 2 illustrates an example provider network that may implement a machine learning service that performs machine learning model compression, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network 200, in one embodiment. In some embodiments, provider network 200 may implement various computing resources or services, such as machine learning service 210, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below, in one embodiment. In various embodiments, the functionality of a given system or service component (e.g., a component of machine learning service 210 may be implemented by a particular node or may be distributed across several nodes. In some embodiments, a given node may implement the functionality of more than one service system component (e.g., more than one data store component).

Machine learning 210 may implement interface 211 to allow clients (e.g., client(s) 250 or clients implemented internally within provider network 200, such as a client application hosted on another provider network service like an event driven code execution service or virtual compute service) to compress, train, and deploy machine learning models (e.g., neural networks). For example, machine learning service 210 may implement interface 211 (e.g., a graphical user interface, as discussed below with regard to FIG. 4, programmatic interface that implements Application Program Interfaces (APIs) and/or a command line interface) may be implemented so that a client can request compression to be performed on a machine learning model stored in storage service(s) 230, and/or in other storage locations within provider network 200 or external to provider network 200 (e.g., on premise data storage in private networks). Interface 211 may allow a client to request the performance of training, deployment, or other machine learning service features, in various embodiments.

Machine learning service 210 may implement a control plane 212 to perform various control operations to implement the features of machine learning service 210. For example, control plane may monitor the health and performance of requests at different components, such as model compression 213, model training 214 and model deployment 215. If a node fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s), in various embodiments. For example, control plane 212 may receive requests interface 211 which may be a programmatic interface, and identify an available node to begin work on the request.

Machine learning service 210 may implement model compression 213, as discussed in more detail below with regard to FIGS. 3 and 4, to compress machine learning models according to compression profiles, in various embodiments. Machine learning service 210 may implement model training 214 to execute training techniques on various machine learning models using data sets, such as data sets 232 in storage services 230. In various embodiments, machine learning service 210 may implement model deployment 215, which may deploy a trained machine learning model on resources (e.g., virtual compute instances) to receive and return inferences or other results according to requests or other inputs to the deployed model.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds relational or non-relational databases, in some embodiments, Data storage service(s) 230 may include object or file data stores for putting, updating, and getting data objects or files, in some embodiments. For example, one data storage service 230 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as image data files (e.g., digital photos or video files) audio files and web site log files. Data storage service(s) 230 may be accessed via programmatic interfaces (e.g., APIs) or graphical user interfaces.

Generally speaking, clients 250 may encompass any type of client that can submit network-based requests to provider network 200 via network 260, including requests for machine learning service 210 (e.g., a request to search or identify an object using an object recognition index, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of Object recognition service 210 to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. Clients 250 may convey network-based services requests (e.g., access requests to read or write data may be via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Although different types of compression may be applied, in some embodiments, machine learning service 210 may implement pruning for compression of a neural network. Similar features may be implemented for other compression techniques in addition to or instead of pruning. FIG. 3 illustrates a logical block diagram illustrating machine learning model compression using a pruning profile index to select and prune neural networks, according to some embodiments. A request to prune a neural network artifact 350 may be received a machine learning service 210 via interface 211. The request may specify an identifier or type of artifact as well as various other features of the compression to be applied. Compression job management 340, which may be implemented as part of control plane 212, may initiate a compression job in model compression 213.

The neural network artifact 360 may be obtained by model compression 213. Architecture extraction 310 may be implemented to identify or otherwise obtain the architecture of the neural network (e.g., parsing the file or other encoding of the artifact). In some embodiments, external neural network architecture sources may be searched or previously searched and cataloged for architecture extraction to compare for identify architecture 362. Architecture extraction 310 may then provide the architecture 362 to pruning profile selection 320.

Figure 6:
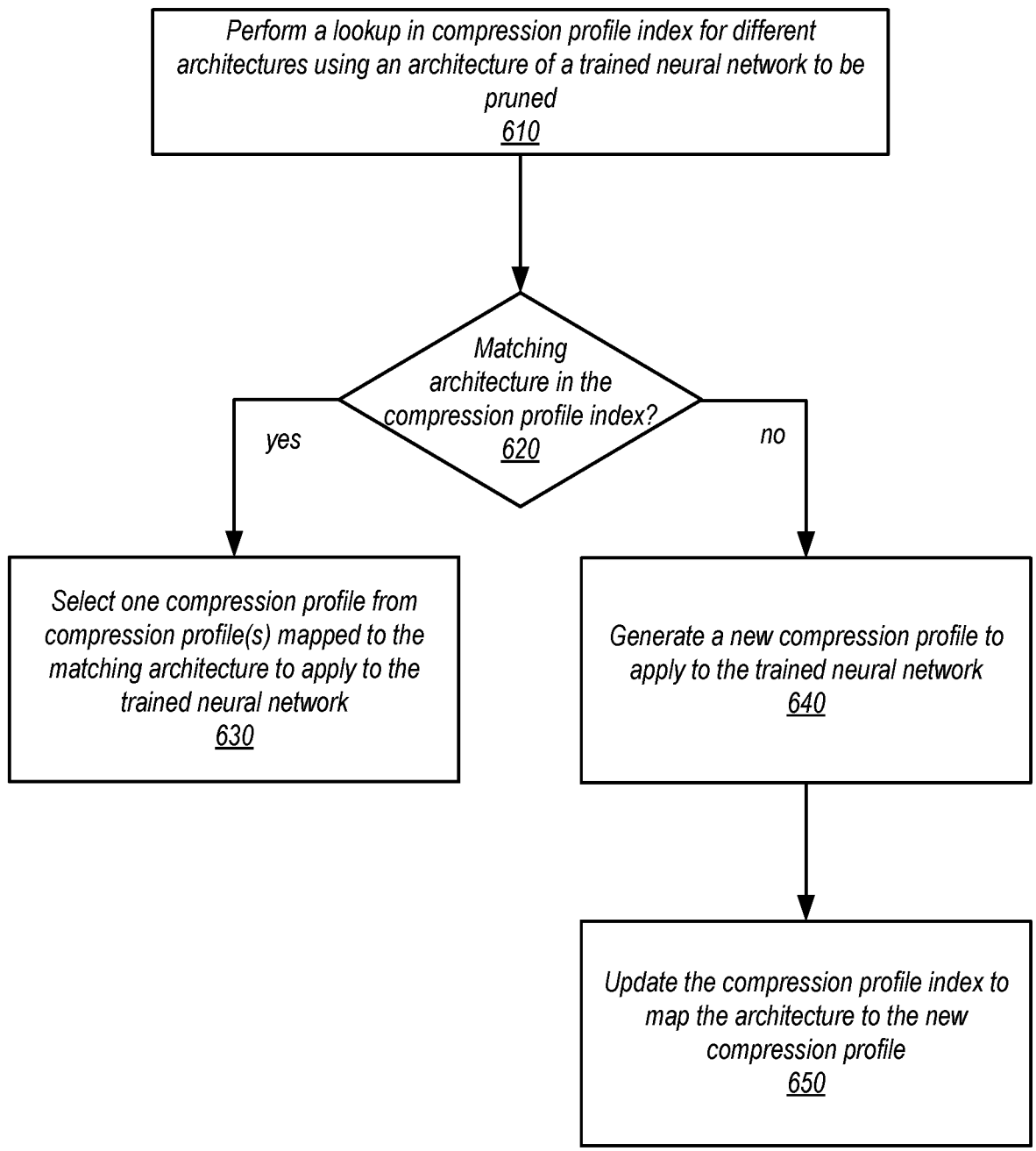
FIG. 6 illustrates a high-level flowchart of various methods and techniques to implement selecting a compression profile for a neural network from a compression profile index, according to some embodiments.

Pruning profile selection 320 may perform a lookup 374 on pruning profile index 324 (as discussed below with regard to FIG. 6). For example, index values may be determined from an architecture 362 (or label, indicator, type, version, or other identifier of the architecture 362) to check to see if a match is located. If a match is found, then the corresponding pruning profile may be provided. As noted above with regard to FIG. 1 and below with regard to FIG. 6, multiple profiles could match. In such scenarios one of the matching profiles may be selected and provided or multiple (or all) profiles may be provided.

If a match is not found, then pruning profile generator 322 may provide a new pruning profile 372. The new pruning profile 372 may also be provided to pruning profile index 324 for subsequently received requests for the same (or similar) architecture. For example, a pruning policy may indicate, among other features for generating a pruning profile a technique to determine where and how much to prune for networks and/or layers using heuristics, learned, or online techniques. For instance, a pruning policy can specify or determine how much to prune can be taken at either a network-level or at a layer-level. While network-level decisions can be made once for every network, layer-level decisions may be made once every layer according to the policy. Since making layer-level decisions may implicitly make a network-level decision, often network-level decisions may be made first and propagated to layer-level. In some embodiments, a network-level policy may not propagate down to layer-level and may ignores the layer of the channel by treating all channels equally. Several types of policies can be used to decide how much to prune by pruning profile generator 322. These can range from heuristics such as a uniform pruning policy across all layers, to learning a policy either online or offline, either using an reinforcement learning (RL) or gradient-based methods, on observing some properties of the network or layer, depending on the level such as the correlation analysis of layers. For heuristic approaches, the heuristics may be designed in accordance to constraints based on the target of the compressed model. In iterative pruning techniques such as the work, the heuristics may also progressively be reduced. In some embodiments, a policy agent may be implemented to determine how much to prune layer-wise online.

Pruning policies applied by pruning profile generator 322 to generate pruning profiles may also determine which features, such as which channel, to prune in the pruning profile, in some embodiments, as indicated. A pruning policy may provide information to determine which channels, for instance, are to be removed. In some embodiments, not all policies for deciding which features (e.g., channels) to remove be contingent on an a priori policy for how much to prune. Rather, a direct policy for which channels to prune could implicitly decide how much to prune as well, in some embodiments. In some embodiments, the importance of channels can be weighted before deciding which to channel prune. Some pruning policies may provide profiles that completely freeze pruned layers or remove them altogether, while other pruning policies may allow soft pruning at prune-time allowing parameters to recover back if they are needed, in some embodiments. Typical options for which channels to prune contingent on a previously made decision for how much to prune involve random decisions such as sampling from a Bernoulli distribution or using metrics of the layer's features (e.g., tensors), such as pruning the channels with the least expected L1 of weights, in some embodiments. Use of L1 of channels to select which channels to prune may be implemented in some embodiments. Techniques that utilize metrics in the above fashion may sometimes be referred to as "max-metric".

Pruning profile selection 320 may provide the pruning profile 364 that is selected to pruner 330. Pruner 330 may obtain the neural network artifact 360 and apply the pruning technique using the pruning profile. For example, pruner 330 may alter the file, structure, or other data object storing neural network artifact to remove or delete the specified features in the network, layer, channel or other portion of the neural network artifact. Pruner 330 may then provide the pruned artifact 366 for subsequent processing. Pruner 330 may also indicate to compression job management 340 to update the compression job state to tuning 354.

As discussed in detail below with regard to FIG. 7, pruning profile index 324 may be updated to include new and additional pruning profiles in order to improve performance of compression. Some new pruning profiles may be received from pruning profile generator. Other new pruning profiles may be received as part of updates 378 from index management 326. In various embodiments, model compression 213 may implement index management 326 which may obtain pruning profile performance 276 as discussed below and provide updates 378 to add, replace, and/or remove pruning profiles with new/better pruning profiles. For example, in scenarios where multiple matching pruning profiles exist, low performing pruning profiles may be removed (e.g., according to a performance threshold). In some embodiments, modifications to the ordering or priority for matching pruning profiles may be applied as part of updates 378, so that a different pruning profile may be selected when multiple pruning profiles match.

In various embodiments, compressed (e.g., pruned) neural networks may be tuned in order to provide a ready-to-use network after features are removed. FIG. 4 illustrates a logical block diagram illustrating the tuning of a pruned neural network, according to some embodiments, which may be implemented as part of a machine learning service. Similar systems and techniques could be implemented in other systems and/or locations (e.g., on provider network client networks or resources), which may be closer to a training data set.

As indicated at 432, compression job management 340 may initiate training to tune pruned artifact in model training 214. In alternative embodiments, other training services, systems, or applications may be utilized (e.g., on premise or client-controlled training systems). One or more training node(s) 410 (or cluster(s) of training nodes) may obtain 440 the pruned artifact and get 442 the tuning data set 420 from storage services 230 in order to fine tune the compressed model. Training techniques may be specified in the request to compress the neural network and/or may be implemented or selected according to default training parameters. The training techniques may be performed and the tuned and pruned artifact 446 may be provided to a specified destination (e.g., for deployment). As noted earlier, a client can provide the tuning data set 420, in some embodiments, by submitting a request to store the tuning data set 422 in storage services 230. Once tuned, model training 214 may change job state to complete 434, in some embodiments.

Figure 3:
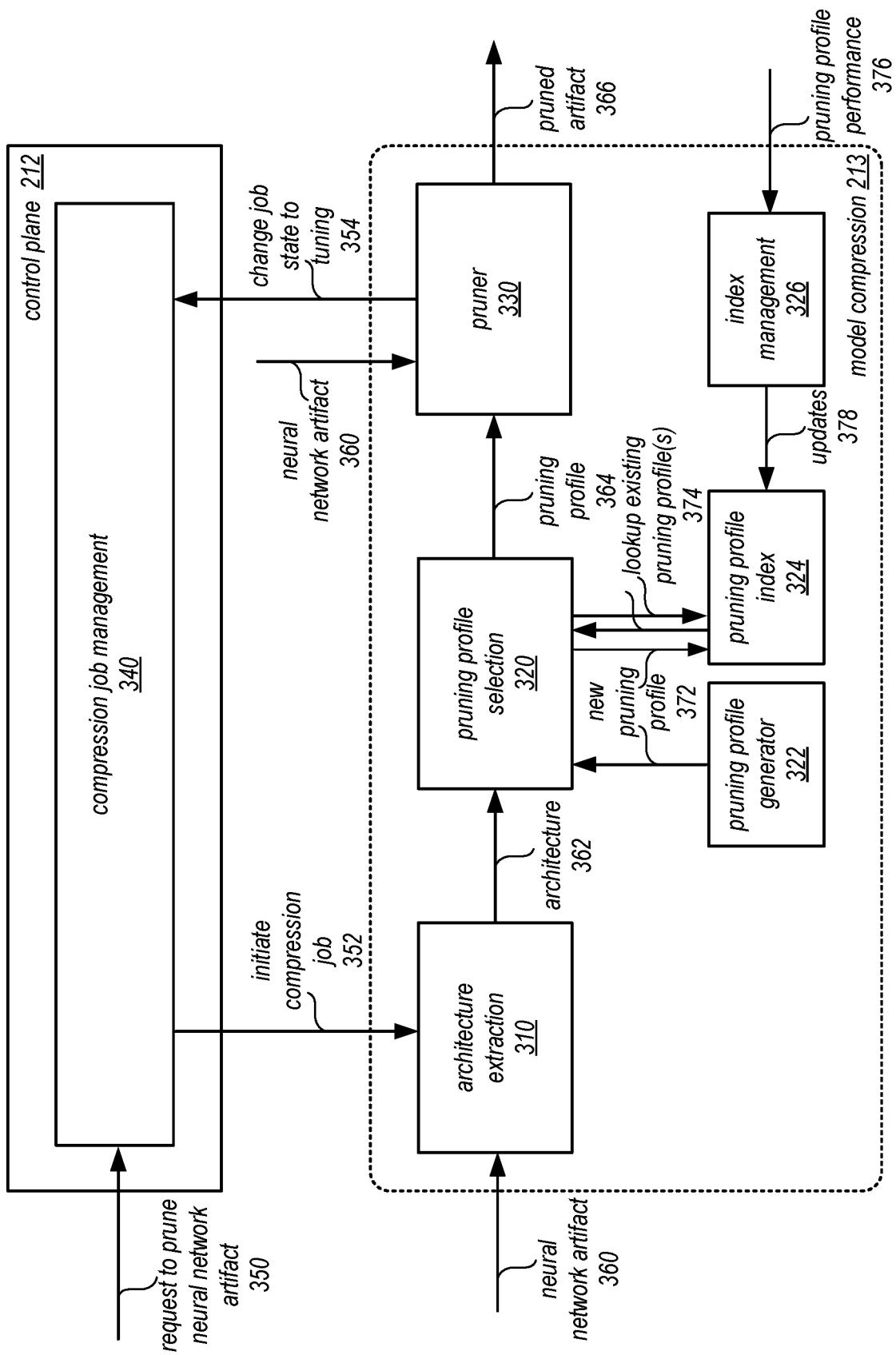
FIG. 3 illustrates a logical block diagram illustrating machine learning model compression using a pruning profile index to select and prune neural networks, according to some embodiments.
Figure 4:
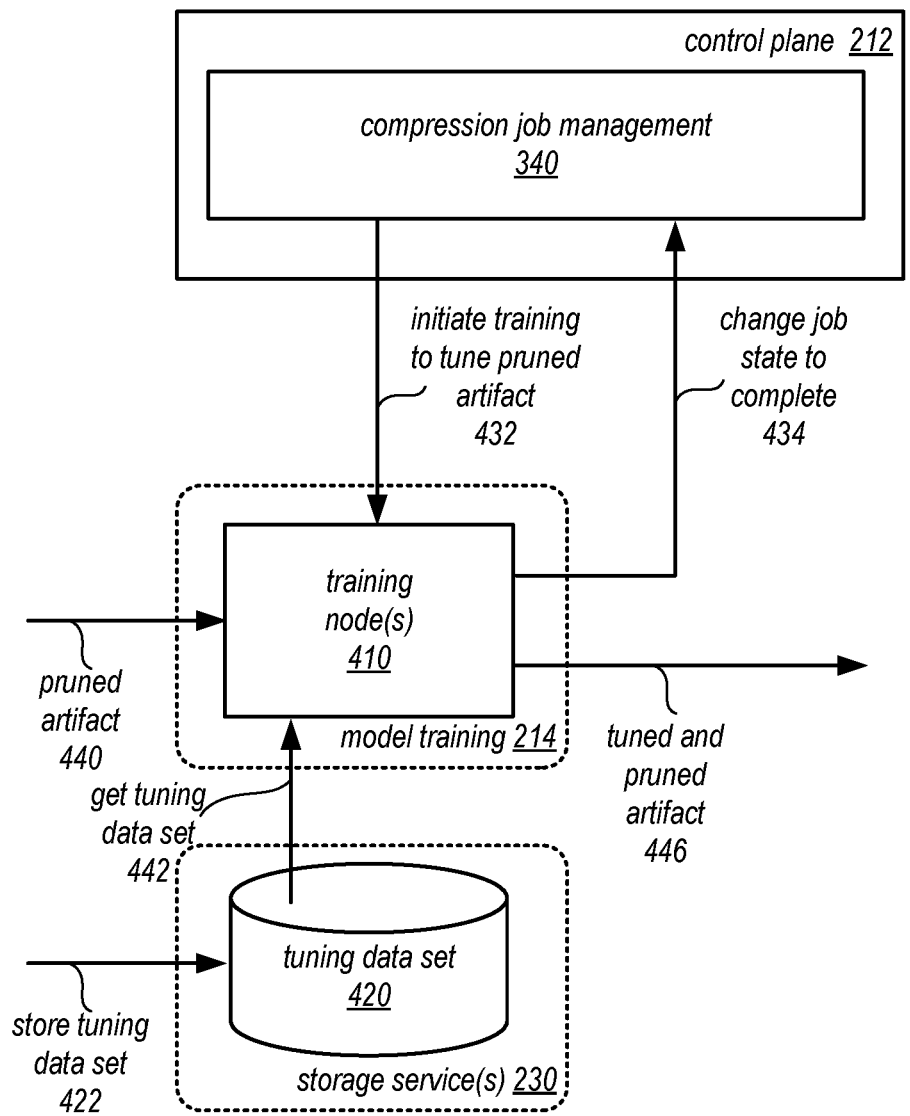
FIG. 4 illustrates a logical block diagram illustrating the tuning of a pruned neural network, according to some embodiments.

Although FIGS. 2 - 4 have been described and illustrated in the context of a provider network implementing a machine learning service, the various components illustrated and described in FIGS. 2 - 4 may be easily applied to other compression systems and/or machine learning systems that compress neural networks. As such, FIGS. 2 - 4 are not intended to be limiting as to other embodiments of applying compression profiles across similar neural network architectures.

Figure 5:
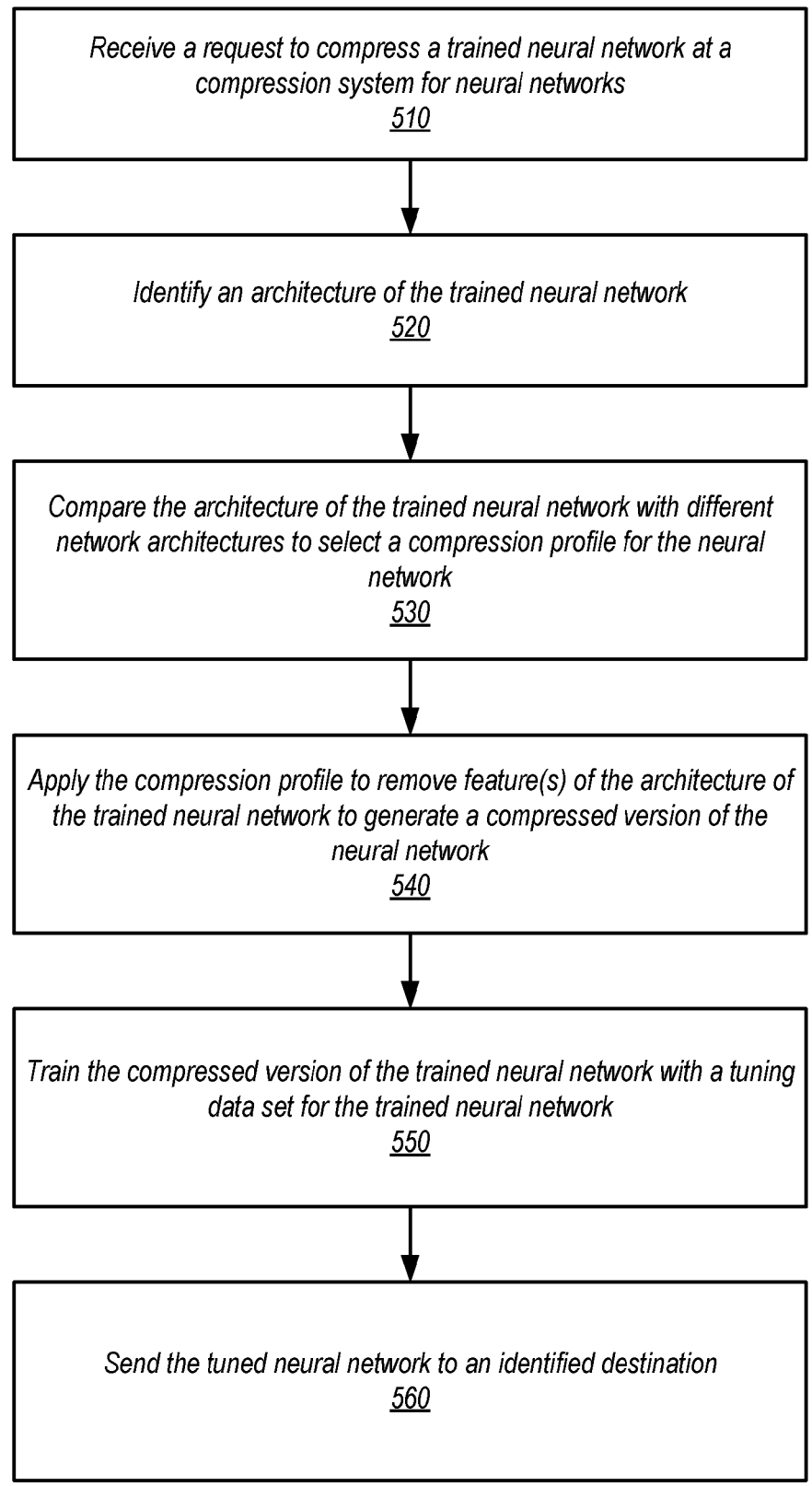
FIG. 5 illustrates a high-level flowchart of various methods and techniques to implement applying compression profiles across similar neural network architectures, according to some embodiments.

FIG. 5 illustrates a high-level flowchart of various methods and techniques to implement applying compression profiles across similar neural network architectures, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices.

As indicated at 510, a request may be received to compress a trained neural network at a compression system for neural networks, in some embodiments. For example, the request may be received via an API, command line interface, graphical user interface, web console, or other interface, and may specify an identifier for the trained neural network. Various other configuration information or parameters for performing compression may be specified, such as the location of tuning data set, the destination of a trained and tuned neural network, compression performance criteria, etc., may be specified in the request.

As indicated at 520, an architecture of the trained neural network may be identified, in some embodiments. For example, in various embodiments, a file (or files) for encoding a neural network can be parsed to locate metadata, configuration information, schema, or other structure data that specifies the architecture (e.g., common architecture names or identifiers, relation/structure information between model components, etc.). The identity of the architecture may be mapped or encoded to a version, name, or other identifier for representing the architecture, in some embodiments.

As indicated at 530, the architecture of the trained neural network may be compared with different network architectures to select a compression profile for the neural network, in various embodiments. For example, the representation may be hashed, compared, or otherwise used to identify a location of a mapping, as discussed below. For non-existent mappings, techniques to generate a compression profile may be performed in order to use the generated compression profile as the selected compression profile.

As indicated at 540, the compression profile may be applied to remove feature(s) of the architecture of the trained neural network to generate a compressed version of the neural network, in some embodiments. For example, the compression profile may be generated by a compression policy that provides a heuristic or other value that indicates the number of channels or neurons to remove at each hidden layer of a neural network. The application of the compression policy to generate the compression profile may determine how many and which features of the neural network to remove in the compression profile. For example, the compression profile may be generated to use a random selection for the architecture, and thus the randomly selected nodes (e.g., A, Q, T, V) may be specified in the compression profile for the architecture (even though the random selection of these nodes was performed when the profile was created). For heuristic based policies that specify an even number of features to remove across layers, then the compression profile may specify 15 nodes in layer A, 15 nodes in layer B, 15 nodes in layer C, and so on. In some embodiments, multiple compression profiles may be selected and applied (as illustrated in FIG. 1) so that multiple compressed versions of the trained neural network may be provided.

As indicated at 550, the compressed version of the trained neural network may be trained with a tuning data set for the trained neural network, in some embodiments. For example, the same training technique used to train the uncompressed data set may be specified for the neural network and applied again using the same data set as the tuning data set in order to fine tune the neural network to adjust for the changes made during compression. In other embodiments, pseudo-rehearsal and/or distillation-based techniques may be performed to fine tune a compressed version of the trained neural network. As indicated at 560, the tuned neural network may then be sent to an identified destination, in some embodiments. For example, the trained neural network may be sent to the destination specified in the request, as a response to the request, or stored alongside the uncompressed version of the neural network, in some embodiments.

As noted earlier, because compression profiles generated for a neural network architecture can provide efficient compression performance for a differently trained neural network with a same (or similar) architecture, storing compression profiles according to architecture can be implemented to provide fast compression when compression of a trained neural network is requested. FIG. 6 illustrates a high-level flowchart of various methods and techniques to implement selecting a compression profile for a neural network from a compression profile index, according to some embodiments. As indicated at 610, a lookup may be performed in a compression profile index using an architecture of a trained network to be pruned, in some embodiments. For example, the architecture may be represented as a version or other identifier that acts as a lookup key for performing a fast search. In some embodiments, the architecture itself may be compared (e.g., by comparing structure) with already received/known architectures to perform the lookup. a As indicated at 620, a determination may be made as to whether a match for the architecture is found in the compression profile index, if so, then one of the compression profile(s) mapped to the matching architecture may be selected to apply to the trained neural network, in some embodiments. For example, multiple different compression profiles could be applied to a same architecture. In some embodiments, the architectures could be selected according to a generalized ranking of different compression profile performance. In other embodiments, the compression profile performance of different attributes can be optimized different for different profiles (e.g., one optimizes memory, one latency, one processor utilization, etc.) so that selection of a compression profile may be based on a specified criteria or feature to be optimized by compression, in some embodiments.

As indicated by the negative exit from 620, a new compression profile may be generated to apply to the trained neural network 620, in some embodiments. For example, a randomized compression policy may be applied and used to generate a compression profile which random features in a network or layer of a network to remove. In some embodiments, the compression profile of a similar architecture may be used to generate the new compression profile.

As indicated at 650, in various embodiments, the compression profile index may be updated to map the new architecture to the new compression profile, in some embodiments. By updating the compression profile index, the new compression profile can be applied to subsequent compression requests for differently trained neural networks with the same architecture, increasing compression performance for those subsequently received, trained neural networks.

Figure 7:
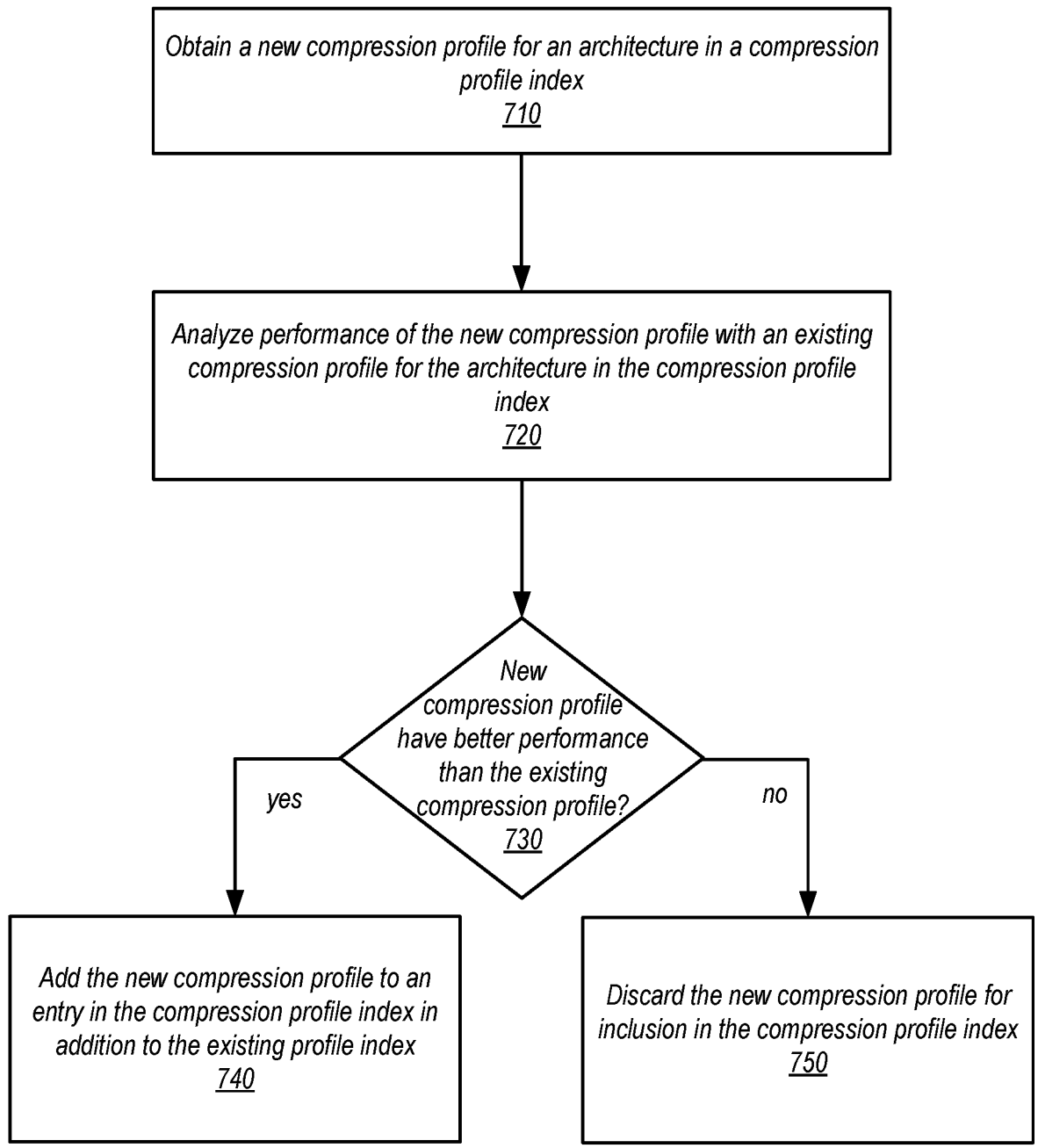
FIG. 7 illustrates a high-level flowchart of various methods and techniques to implement updating a compression profile index for compressing neural networks, according to some embodiments.

FIG. 7 illustrates a high-level flowchart of various methods and techniques to implement updating a compression profile index for compressing neural networks, according to some embodiments. As indicated at 710, a new compression profile for architecture in a compression profile index may be obtained, in some embodiments. For example, a client can submit a compression profile to user for a compression job, which may be stored or mapped to an architecture for that compression job. A new compression profile may be generated, as discussed above with regard to FIG. 6.

As indicated at 720, performance of the compression profile with an existing compression profile for the architecture in the compression profile index may be analyzed, in some embodiments. For example, memory utilization, processor utilization, latency or other performance measures may be compared. As indicated by the positive exit from 730, if the new compression profile has better performance than the existing compression profile, then the new compression profile may be added to an entry for the architecture that includes the existing compression profile in the compression profile index, in some embodiments, as indicated at 740. An ordering or priority for entries for the architecture may be updated to reflect the better performance of the new compression profile.

As indicated by the negative exit from 750, if the new compression profile does not have better performance than the existing compression profile, then discard the new compression profile for inclusion in the compression profile index, in some embodiments.

The methods described herein may in various embodiments be implemented by any combination of hardware and software. For example, in one embodiment, the methods may be implemented on or across one or more computer systems (e.g., a computer system as in FIG. 8) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 8:
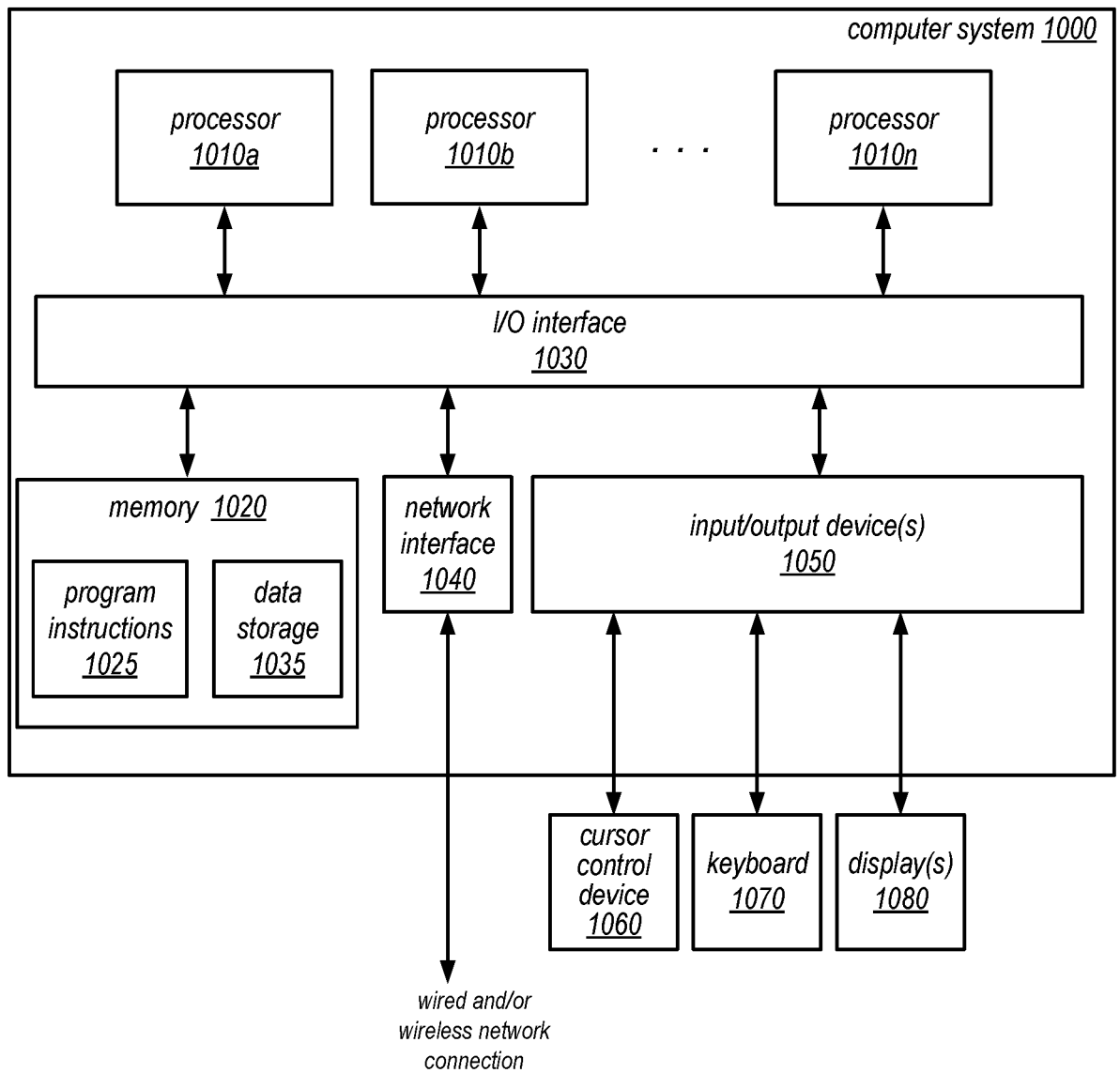
FIG. 8 illustrates an example system to implement the various methods, techniques, and systems described herein, according to some embodiments.

Embodiments of applying compression profiles across similar neural network architectures as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
at least one processor; and
a memory, storing program instructions that when executed cause the at least one processor to implement a compression system, the compression system configured to:
receive a request to compress a neural network artifact;
extract an architecture from the neural network artifact;
compare the architecture with individual ones of a plurality of different network architectures to select a compression profile out of a plurality of different compression profiles for the neural network artifact according to the comparison, wherein the plurality of different compression profiles comprise different respective information useable to determine which feature to remove from a given architecture;
remove one or more features of the architecture of the neural network artifact according to the selected compression profile to generate a compressed version of the neural network artifact;
tune the compressed version of the neural network artifact with a tuning data set for the neural network artifact; and
send the tuned neural network artifact to an identified destination.

2. The system of claim 1, wherein to compare the architecture of the neural network artifact with individual ones of the plurality of different network architectures to select the compression profile out of a plurality of different compression profiles for the neural network artifact according to the comparison, the compression system is configured to:
perform a lookup in a compression profile index for the plurality of different architectures for a match with the architecture;
determine that the match for the architecture is not present in the compression profile index; and
generate a new compression profile to add to the plurality of different compression profiles; and
select for the neural network artifact.

3. The system of claim 1, wherein to compare the architecture of the neural network artifact with individual ones of the plurality of different network architectures to select the compression profile out of a plurality of different compression profiles for the neural network artifact according to the comparison, the compression system is configured to:
perform a lookup in a compression profile index for the plurality of different architectures for a match with the architecture, wherein the compression profile index comprises mappings to the plurality of different compression profiles;
determine a match for the architecture in the compression profile index; and
select as the compression profile for the neural network artifact, a mapped compression profile for the matching architecture in the compression profile index, wherein the compression profile index comprises mappings to the plurality of different compression profiles.

4. The system of claim 1, wherein the compression system is implemented as part of a machine learning service offered by a provider network, wherein the request to compress the trained neural network is received from a client external to the provider network, and wherein the identified destination to send the trained and tuned neural network is the client.

5. A method, comprising:
receiving a request to compress a trained neural network at a compression system for trained neural networks;
identifying, by the compression system, an architecture of the trained neural network;
comparing, by the compression system, the architecture of the trained neural network with individual ones of a plurality of different network architectures to select a compression profile out of a plurality of different compression profiles for the trained neural network according to the comparison, wherein the plurality of different compression profiles comprise different respective information useable to determine which feature to remove from a given architecture;
applying, by the compression system, the compression profile to remove one or more features of the architecture of the trained neural network to generate a compressed version of the trained neural network;

training, by the compression system, the compressed version of the trained neural network with a tuning data set for the neural network; and sending the trained and compressed version of the trained neural network to an identified destination.

6. The method of claim 5, wherein applying the compression profile to remove one or more features of the architecture of the trained neural network to generate the compressed version of the trained neural network comprises randomly selecting the one or more features from one or more layers of the trained neural network to remove.

7. The method of claim 5, wherein comparing the architecture of the trained neural network with individual ones of a plurality of different network architectures to select a compression profile out of a plurality of different compression profiles for the trained neural network according to the comparison comprises:

performing a lookup in a compression profile index for the plurality of different architectures for a match with the architecture;

determining that the match for the architecture is not present in the compression profile index; and generating a new compression profile to add to the plurality of different compression profiles; and selecting for the trained neural network.

8. The method of claim 7, further comprising:

updating the compression profile index to include the architecture and a mapping to the new compression profile;

receiving a second request to compress a second trained neural network; and using the new compression profile in the compression profile index to compress the second trained neural network according to a determination that an architecture of the second trained neural network matches the architecture of the trained neural network when performing a lookup in the compression profile index for the second request.

9. The method of claim 5, wherein comparing the architecture of the trained neural network with individual ones of a plurality of different network architectures to select a compression profile out of a plurality of different compression profiles for the trained neural network according to the comparison comprises:

performing a lookup in a compression profile index for the plurality of different architectures for a match with the architecture;

determining that the match for the architecture exists for one of the plurality of different architectures in the compression profile index, wherein two or more of the plurality of different compression profiles are mapped to the matching one of the plurality of different architectures; and selecting one of the plurality of different compression profiles mapped to the matching one of the plurality of different architectures according to one or more selection criteria for compression profiles.

10. The method of claim 5, further comprising:

obtaining a new compression profile for one of the plurality of different architectures mapped in a compression profile index;

analyzing performance of the new compression profile with an existing compression profile mapped to the one architecture in the compression profile index; and responsive to determining that the new compression profile has better performance than the existing compression profile, replacing the existing compression profile with the new compression profile in the compression profile index.

11. The method of claim 5, wherein the tuning data set is received via a request to store the tuning data set for training the compressed version of the trained neural network.

12. The method of claim 5, wherein the respective information of the selected compression profile determines a number of features to remove from one or more layers of the trained neural network.

13. The method of claim 5, wherein the compression system is implemented as part of a machine learning service offered by a provider network, wherein the request to compress the trained neural network is received from a client external to the provider network, and wherein the identified destination to send the trained and tuned neural network is the client.

14. One or more non-transitory, computer-readable storage media, storing program instructions that when executed on or across one or more computing devices cause the one or more computing devices to implement a compression system for neural networks that implements:

receiving a request to compress a trained neural network;

identifying an architecture of the trained neural network;

comparing the architecture of the trained neural network with individual ones of a plurality of different network architectures to select a compression profile out of a plurality of different compression profiles for the trained neural network according to the comparison, wherein the plurality of different compression profiles comprise different respective information useable to determine which feature to remove from a given architecture;

removing one or more features of the architecture of the trained neural network according to the selected compression profile to generate a compressed version of the trained neural network;

training the compressed version of the trained neural network with a tuning data set for the neural network; and sending the tuned neural network to an identified destination.

15. The one or more non-transitory, computer-readable storage media of claim 14, wherein, in the architecture of the trained neural network with individual ones of a plurality of different network architectures to select a compression profile out of a plurality of different compression profiles for the trained neural network according to the comparison, the program instructions cause the one or more computing devices to implement:

performing a lookup in a compression profile index for the plurality of different architectures for a match with the architecture;

determining that the match for the architecture is not present in the compression profile index; and generating a new compression profile to add to the plurality of different compression profiles; and selecting for the trained neural network.

16. The one or more non-transitory, computer-readable storage media of claim 15, storing further instructions that when executed by the one or more computing devices cause the one or more computing devices to further implement:

updating the compression profile index to include the architecture and a mapping to the new compression profile;

receiving a second request to compress a second trained neural network; and using the new compression profile in the compression profile index to compress the second trained neural network according to a determination that an architecture of the second trained neural network matches the architecture of the trained neural network when performing a lookup in the compression profile index for the second request.

17. The one or more non-transitory, computer-readable storage media of claim 14, wherein, in removing the one or more features of the architecture of the trained neural network according to the compression profile to generate the compressed version of the trained neural network, the program instructions cause the one or more computing devices to implement randomly selecting the one or more features from one or more layers of the trained neural network to remove.

18. The one or more non-transitory, computer-readable storage media of claim 14, wherein the tuning data set is received via a request to store the tuning data set for training the compressed version of the trained neural network.

19. The one or more non-transitory, computer-readable storage media of claim 14, storing further instructions that when executed by the one or more computing devices cause the one or more computing devices to further implement:
   obtaining a new compression profile for one of the plurality of different architectures mapped in a compression profile index;
   analyzing performance of the new compression profile with an existing compression profile mapped to the one architecture in the compression profile index; and
   responsive to determining that the new compression profile does not have better performance than the existing compression profile:
      retaining the existing compression profile in the compression index; and
      adding the new compression profile in the compression profile index as an additional compression profile mapped to the one architecture.

20. The one or more non-transitory, computer-readable storage media of claim 14, wherein the compression system is implemented as part of a machine learning service offered by a provider network, wherein the request to compress the trained neural network is received from a client external to the provider network, and wherein the training the compressed version of the trained neural network with the tuning data set for the neural network is performed on one or more nodes associated with the client.

* * * * *